United States Patent
Cruz Hernandez et al.

(10) Patent No.: US 10,599,221 B2
(45) Date of Patent: Mar. 24, 2020

(54) SYSTEMS, DEVICES, AND METHODS FOR PROVIDING LIMITED DURATION HAPTIC EFFECTS

(71) Applicant: IMMERSION CORPORATION, San Jose, CA (US)

(72) Inventors: Juan Manuel Cruz Hernandez, Montreal (CA); Danny A. Grant, Laval (CA); Christopher J. Ullrich, Ventura, CA (US)

(73) Assignee: IMMERSION CORPORATION, San Jose, CA (US)

( * ) Notice: Subject to any disclaimer, the term of this patent is extended or adjusted under 35 U.S.C. 154(b) by 84 days.

(21) Appl. No.: 16/010,186

(22) Filed: Jun. 15, 2018

(65) Prior Publication Data
US 2019/0384396 A1  Dec. 19, 2019

(51) Int. Cl.
*B06B 1/02* (2006.01)
*G06F 3/01* (2006.01)

(52) U.S. Cl.
CPC ............ *G06F 3/016* (2013.01); *B06B 1/0246* (2013.01)

(58) Field of Classification Search
None
See application file for complete search history.

(56) References Cited

U.S. PATENT DOCUMENTS

| | | | | |
|---|---|---|---|---|
| 6,411,276 B1 * | 6/2002 | Braun | ................... | G05G 9/047 345/156 |
| 2010/0312129 A1* | 12/2010 | Schecter | .............. | A61B 5/0031 600/508 |
| 2012/0249462 A1 | 10/2012 | Flanagan et al. | | |
| 2012/0265051 A1* | 10/2012 | Fischer | .............. | A61B 10/0241 600/411 |
| 2015/0005039 A1* | 1/2015 | Liu | ................... | H04M 1/72569 455/567 |
| 2015/0084875 A1* | 3/2015 | Liu | ........................ | G06F 3/016 345/173 |
| 2016/0155305 A1 | 6/2016 | Barsilai et al. | | |

FOREIGN PATENT DOCUMENTS

EP  3211504 A1  8/2017

OTHER PUBLICATIONS

The Extended European Search Report issued in European Application No. 19180454, dated Oct. 22, 2019.

* cited by examiner

*Primary Examiner* — Parul H Gupta
(74) *Attorney, Agent, or Firm* — Medler Ferro Woodhouse & Mills PLLC

(57) ABSTRACT

Systems, devices, and methods for providing limited duration haptic effects are disclosed. Systems for providing limited duration haptic effects include sensors, control circuits, and vibration actuators configured closed loop feedback control of the vibration actuators. The sensors are configured to measure motion characteristics induced by the vibration actuators. The control circuits are configured to receive motion characteristic information from the sensors and provide closed loop feedback control of the vibration actuators. Closed loop feedback control permits precise control of vibration actuator output during limited duration haptic effects.

22 Claims, 10 Drawing Sheets

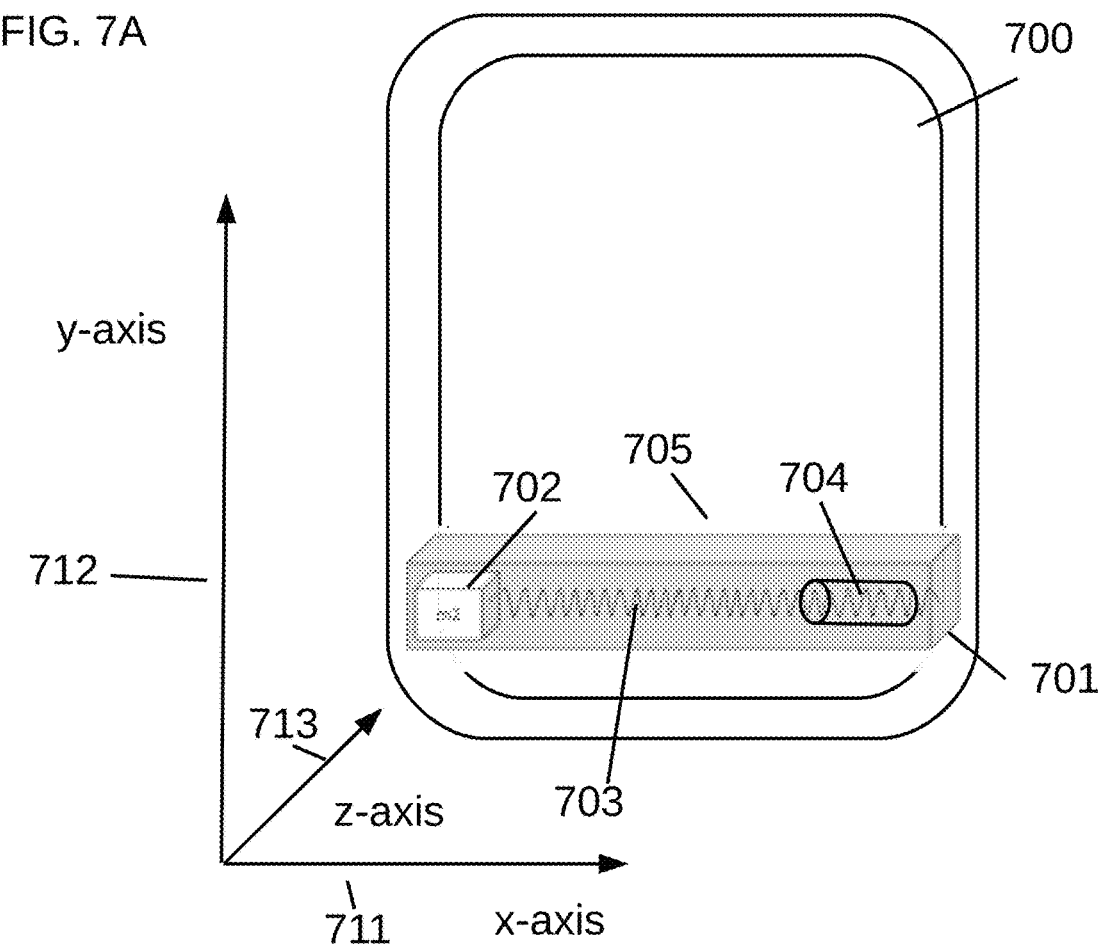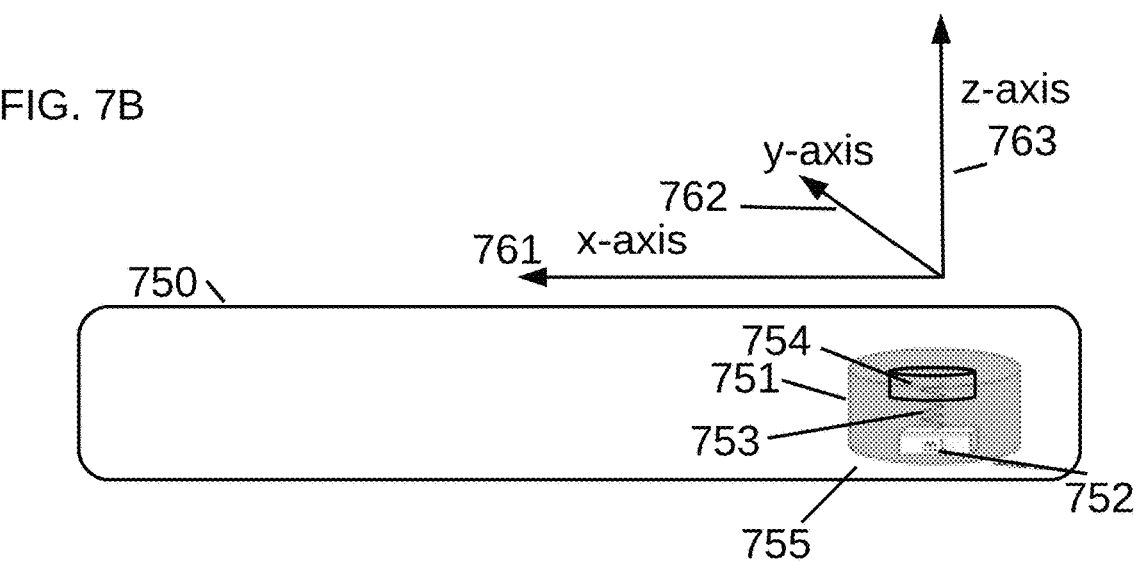

SYSTEMS, DEVICES, AND METHODS FOR PROVIDING LIMITED DURATION HAPTIC EFFECTS

FIELD OF THE INVENTION

The present invention relates to systems, devices and methods for providing haptic effects of limited duration. In particular, the present invention is directed to providing techniques for closed loop feedback control of vibration actuators to produce well defined haptic effects of limited duration.

BACKGROUND OF THE INVENTION

Haptic actuators for producing vibration effects, i.e., vibration actuators such as eccentric rotating masses, linear resonant actuators, piezo based actuators, etc., are conventionally used in haptically enabled devices to provide vibration effects of moderate to long durations. Such haptic effects present to a user as buzzing or vibrating sensations. Providing a buzzing sensation can be implemented through excitation of a vibration actuator for many, e.g., dozens, hundreds, or even thousands of oscillations. Such vibration effects are implemented through conventional open loop control techniques of the vibration actuators. Precise actuator control over limited durations in these circumstances is not required and would introduce unnecessary costs in device manufacture.

In some circumstances, it may be desirable to produce haptic effects of limited duration, wherein a vibration actuator undergoes only a few, e.g., less than ten, oscillations. Such haptic effects may present to a user as clicks rather than buzzes. These types of clicks may be desirable, for example, to provide the sensation and satisfaction of a mechanical response to a touchscreen input. Conventionally, open loop control techniques and hardware are adapted to provide these short duration clicks by, for example, implementing actuator braking. To retain a high-quality well-defined sensation with a sharp edge through open loop braking may require good actuator characterization. Deviation in the actuator from the characteristics of the open loop control scheme can result in an effect that trails off rather than ends sharply. Thus, for example, variance from a specified resonant frequency of a linear resonant actuator can result in degraded limited duration haptic effects. Conventional solutions to this problem include post manufacture characterization of actuator outputs and adjustment of open loop control parameters.

Inventions described herein provided improved methods of generating limited duration haptic effects in haptically enabled devices.

BRIEF SUMMARY OF THE INVENTION

Systems, devices, and methods are provided herein to accommodate closed loop feedback control of vibration actuators to produce precise haptic vibration effects of limited duration. Heretofore, closed loop feedback control has not been applied to vibration actuators because it is believed that conventional vibration effects do not require precise control. Conventional haptically enabled devices also do not include the necessary components for closed-loop control and the introduction of such components is believed to unnecessarily increase the cost of such devices.

Embodiments hereof may include sensors, control circuits, and vibration actuators specifically configured to provide closed loop control capabilities for the production of limited duration vibration effects. Embodiments further may include devices and systems incorporating these components as well as methods of implementing closed-loop control techniques to provide limited duration haptic effects.

In an embodiment, a haptically enabled device is provided. The haptically enabled device may include a vibration actuator, a sensor, configured to measure a motion characteristic including at least one of acceleration, velocity, and displacement of a component of the haptically enabled device, and to output a motion characteristic feedback signal. The haptically enabled device may include a control circuit comprising an integrated circuit including a microprocessor configured to control the vibration actuator to produce a limited duration haptic effect of less than 20 ms. The control circuit of the haptically enabled device may perform the control by receiving a desired effect signal, the desired effect signal representing the limited duration haptic effect, may provide a control signal to activate the vibration actuator, may sample the motion characteristic feedback signal at a sampling frequency of at least 10 kHz, and may continuously adjust the control signal at the sampling frequency according to the motion characteristic feedback signal and the desired effect signal while continuously providing the control signal, wherein continuously adjusting the control signal minimizes an error between the desired effect signal and the motion characteristic feedback signal.

In an embodiment, a method of controlling a vibration actuator of a haptically enabled device to produce a limited duration haptic effect is provided. The method may include receiving, by a control circuit comprising an integrated circuit including a microprocessor, a desired effect signal, the desired effect signal representing the limited duration haptic effect, the limited duration haptic effect being less than 20 ms. The method may include providing, by the control circuit, a control signal to activate the vibration actuator, and measuring, by a sensor over time, a motion characteristic including at least one of acceleration, velocity, and displacement of a component of the haptically enabled device. The method may include outputting, by the sensor, a motion characteristic feedback signal indicative of the motion characteristic, and controlling the vibration actuator to provide the limited duration haptic effect. According to the method the controlling the vibration actuator may be performed by sampling the motion characteristic feedback signal at a sampling frequency of at least 10 kHZ, and continuously adjusting the control signal at the sampling frequency according to the motion characteristic feedback signal and the desired effect signal while providing the control signal, wherein continuously adjusting the control signal minimizes an error between the desired effect signal and the motion characteristic feedback signal.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 7A illustrates an x-axis linear resonant actuator.

FIG. 7B illustrates a z-axis linear resonant actuator.

DETAILED DESCRIPTION OF THE INVENTION

Figure 1:
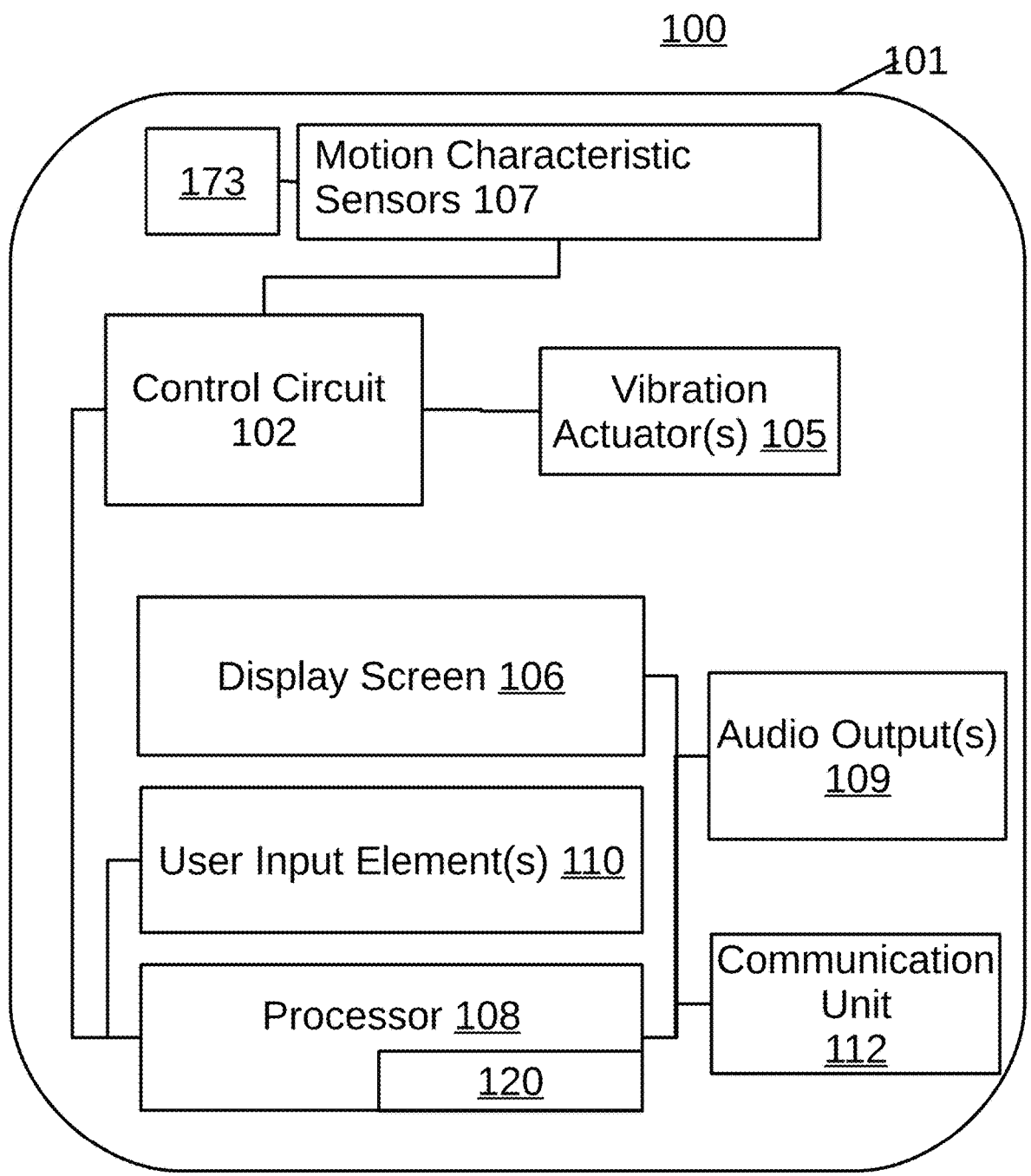
FIG. 1 is a schematic diagram illustrating aspects of a haptically enabled device in accordance with embodiments hereof.

Specific embodiments of the present invention are now described with reference to the figures. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to haptically enabled devices. Haptically enabled devices consistent with embodiments herein may be configured as smartphones, tablet computing devices, smart watches, fitness bands, haptic enabled wearable devices, glasses, virtual reality (VR), augmented reality (AR), and/or mixed reality (MR) headsets, handheld gaming devices, personal computers (e.g., a desktop computer, a laptop computer, etc.), televisions, interactive signs, and/or other devices that can be programmed to provide a haptic output to a user. Haptically enabled devices consistent with embodiments hereof include devices having one or more vibration actuators for delivering vibration effects to the haptically enabled device. In embodiments hereof, haptically enabled devices may also include user input elements, e.g., control elements such as triggers, buttons, joysticks, joypads, touchscreens, touchpads, etc., to permit a user to interact with a computer system. Haptically enabled devices may further include peripheral devices configured to augment the capabilities of other devices, haptically enabled or not.

Haptically enabled devices consistent with embodiments hereof may include processing systems. Processing systems consistent with embodiments described herein include one or more processors (also interchangeably referred to herein as processors, processor(s), or processor for convenience), one or more memory units, audio outputs, user input elements, a communication unit or units, and/or other components. Processors may be programmed by one or more computer program instructions to carry out methods described herein. Communication units consistent with the present invention may include any connection device, wired or wireless, that may transmit or communicate with peripheral devices.

In embodiments hereof, haptically enabled devices may be provided separately from processing systems configured to provide haptic control signals to the haptically enabled device. Such haptically enabled devices include vibration actuators and the required control circuitry and power sources to activate the vibration actuators. Haptically enabled devices provided separately from processing systems may be, for example, wearable devices intended for communication with a central processing system. Haptically enable devices according to these embodiments may include wrist-bands, rings, leg-bands, finger attachments, gloves, eye-glasses, and other types of devices configured to provide haptic outputs.

Embodiments hereof relate to closed-loop feedback control of vibration actuators to produce haptic effects of limited duration. Feedback control systems consistent with embodiments hereof are configured to reduce and/or minimize errors between intended haptic effects, represented by a desired effect signal, and an output haptic effect, represented by a motion characteristic signal. Desired effect signals are provided to represent haptic effects intended to be produced by vibration actuators. In response to the desired effect signals, feedback control systems as described herein control haptic outputs, which are measured by sensors outputting motion characteristic signals. The motion characteristic signals are used by the feedback systems to minimize errors in the haptic output.

As used herein "vibration actuator" refers to an actuator configured to produce a haptic effect by oscillation or vibration in response to a control signal. Vibration actuators consistent with embodiments hereof are capable of producing haptic effects by oscillating or vibrating at 10 Hz or more. Haptic effects of limited duration refer to haptic effects having a duration of less than 100 ms. The length of a limited duration haptic effect may change according to the frequency of actuator. For example, one oscillation of an actuator at 10 Hz requires 100 ms, and a limited duration haptic effect may be 100 ms or less. In contrast, at 1,000 Hz, one oscillation requires just 1 ms, and a limited duration haptic effect may encompass 15 oscillations, taking approximately 15 ms. In embodiments, limited duration haptic effects may have durations less than 100 ms, less than 50 ms, 30 ms, less than 25 ms, less than 20 ms, and/or less than 15 ms. In embodiments, limited duration haptic effects may employ vibration actuators operating between 50 Hz and 500 Hz for durations between 15 ms and 50 ms. Selection of limited duration haptic effect durations may be performed based on the type of actuator being used, the amount of force or displacement provided by the vibration actuator, and/or by the type of effect that is sought by the designer. In embodiments, the duration of the limited duration haptic effect may be determined according to a representative transient time of the vibration actuator producing the haptic effect. Limited duration haptic effects may be produced by a vibration actuator performing anywhere between 1 and approximately 15 oscillations, where the number of oscillations delivered may be selected according to the frequency of the vibration actuator. Embodiments hereof further relate to closed-loop feedback control of vibration actuators to produce sharp haptic effects of limited duration. As used herein, "sharp haptic effects" refers to haptic effects having an abrupt cut-off at the completion of the effect.

In embodiments, vibration actuators consistent with embodiments hereof may include macrofiber composite actuators, capable of producing vibration effects at frequencies between 10 Hz and 10,000 Hz. In further embodiments, vibration actuators consistent with embodiments hereof may include piezoelectric material based vibration actuators, such as piezoceramic actuators, capable of producing vibration effects at frequencies between approximately 10 Hz and 10,000 Hz. In further embodiments, vibration actuators consistent with embodiments hereof may include LRAs, capable of producing vibration effects at frequencies between approximately 50 Hz and 500 Hz. Other types of vibration actuators configured to deliver haptic effects through vibrating components in the frequency range of 10 Hz and 10,000 Hz may be employed with embodiments hereof.

Some vibration actuators consistent with embodiments hereof, such as LRAs, are designed to provide a resonant response to a frequency input, and frequently have a high Q-factor or narrow bandwidth. Such actuators are constructed to minimize damping to provide greater efficiency. Thus, when provided with a command signal at the resonant frequency of the vibration actuator the vibration haptic response is maximized. To prevent wasted energy, such actuators are constructed to minimized friction and other sources of damping. When a control signal to the vibration actuator is ceased, the vibration actuator will still oscillate several times at its resonant frequency. Creating a strong haptic effect requires a commensurately powerful signal which, without damping, will cause the vibration actuator to oscillate several times before slowing to a stop. For conventional uses of vibration actuators, this is an acceptable result, as tens of milliseconds of free oscillations after cessation of a control signal does not degrade a vibration or buzzing haptic effect of several hundred milliseconds. On the contrary, tens of milliseconds of free oscillations will significantly distort an intended 15 millisecond haptic effect.

FIG. 1 is a schematic diagram illustrating aspects of a haptically enabled device 100 in accordance with embodiments hereof. The haptically enabled device 100 includes one or more vibration actuators 105, a control circuit 102, one or more motion characteristic sensors 107, and a housing 101. Optionally, the haptically enabled device 100 further includes a display screen 106, at least one processor 108, at least one memory unit 120, one or more user input elements 110, one or more audio outputs 109, and one or more communication units 112.

The vibration actuators 105 include actuators configured for oscillation or vibration in response to a control signal. Vibration actuators 105 are configured to produce haptic effects when oscillating at frequencies in excess of 50 Hz. Vibration actuators 105 may include actuators configured with a spring-mass oscillatory system, such as linear resonant actuators (LRAs) and voice coil actuators. Linear resonant actuators consistent with embodiments hereof may include x-axis LRAs (xLRAs) and z-axis LRAs (zLRAs), a further description of which is provided below with respect to FIGS. 7A and 7B. Vibration actuators 105 may further include piezoelectric actuators. Vibration actuators 105 consistent with embodiments hereof are configured to produce oscillatory effects ranging between approximately 10 Hz and 1000 Hz.

Motion characteristic sensors 107 include sensors and transducers configured to measure motion. Motion characteristic sensors 107 are configured to measure a motion characteristic of a haptically activated component 173 of the haptically enabled device 100, for example, as shown in each of FIGS. 2-4. The haptically activated component 173 is any component of the haptically enabled device 100 that has its motion characteristics measured by the motion characteristic sensor. Motion characteristic sensors 107 consistent with embodiments hereof include motion characteristic sensors 107 that are collocated with vibration actuators 105 and motion characteristic sensors 107 that are non-collocated with vibration actuators 105. As used herein, motion characteristic sensors 107 that are collocated with a vibration actuator are configured to measure motion characteristics of actuator components, such as the displacement of an actuator mass. Thus, for a collocated motion characteristic sensor 107, the haptically activated component 173 is an actuator sub-component, such as an actuator mass. As used herein, motion characteristic sensors 107 that are non-collocated with a vibration actuator 105 are configured to measure motion characteristics of a haptically activated component 173 that is not part of the vibration actuator 105 for which a vibration actuator 105 induces motion. In embodiments, non-collocated motion characteristic sensors 107 may be attached to haptically activated components 173 of the haptically enabled device 100 to which a vibration actuator 105 is vibrationally coupled. In additional embodiments, non-collocated motion characteristic sensors 107 may be located remotely from the haptically enabled device 100 and measure motion characteristics of haptically activated components 173 to which the motion characteristic sensor 107 is not attached.

Collocated motion characteristic sensors 107 include sensors configured to determine motion characteristics of actuator components. Such motion characteristics may include, for example, vector values such as displacement, force, velocity, momentum, angular velocity, angular momentum, and acceleration as well as scalar values such as speed, distance, and acceleration magnitude. Other motion characteristics may include oscillatory characteristics such as frequency, amplitude, and phase. In embodiments, direct measurement of one or more of the above motion characteristics may be used to determine values for other motion characteristics. For example, direct measurement of acceleration may be used to indirectly determine velocity and/or displacement. In some examples, system parameters may be stored in a memory for use in such determinations. For example, a system's mass may be stored as a parameter and combined with a measurement of acceleration to permit a determination of force. In an example of a collocated motion characteristic sensor 107, the collocated motion characteristic sensor 107 is configured to determine motion characteristics of a moving mass of a vibration actuator 105. In another example, a collocated motion characteristic sensor 107 is configured to measure strain of a spring associated with a spring-mass actuator system. Specific embodiments are discussed below with respect to FIGS. 8 and 9.

Non-collocated motion characteristic sensors 107 include sensors vibrationally coupled, directly or indirectly, to one or more haptically activated components 173 of the haptically enabled device 100 and configured to measure motion characteristics of the one or more haptically activated components 173 of the haptically enabled device 100. As used herein, indirect vibrational coupling between two features means that mechanical forces may be transmitted between the two features without significant damping or other isolating factors in between, even where the features are not directly attached. For example, a motion characteristic sensor 107 mounted to a platform that is attached without damping features to the housing 101 of the haptically enabled device 100 is indirectly vibrationally coupled to the housing 101 and thus the housing 101 may be the haptically activated component 173. As used herein, direct vibrational coupling between two features means that the two features are connected directly to each other, with no intervening components. For example, a motion characteristic sensor 107 screwed to or adhesively attached to a housing 101 of the haptically enabled device 100 is directly vibrationally coupled to the housing 101 acting as the haptically activated component 173. In contrast, two features or components of the haptically enabled device 100 may be referred to as not vibrationally coupled if the two components are either not connected or connected via structures that serve to dissipate mechanical forces such that vibration of one of the components results in no vibration or significantly diminished vibration of the other component. For example, a haptically enabled device 100 may include a display screen 106 mounted to a housing 101 via a suspension system such that vibration of the display screen 106 is not significantly transferred to the housing 101.

In an embodiment, both a vibration actuator 105 and a motion characteristic sensor 107 may be vibrationally coupled, directly or indirectly, to the display screen 106 or the housing 101 of the haptically enabled device 100. The motion characteristic sensor 107 may therefore be configured to determine motion characteristics of the display screen 106 or housing 101 as the haptically activated component 173 to which the motion characteristic sensor 107 and the vibration actuator 105 are mutually coupled. The motion characteristic sensor 107 and the vibration actuator 105 may be located near to each other within the haptically enabled device 100 and/or may be located remote from each other within the device. The motion characteristic sensor 107 is configured to measure motion characteristics of the one or more haptically activated components 173 of the haptically enabled device 100 based on actuation of the vibration actuator 105. Such motion characteristics may include, for example, vector values such as displacement, force, velocity, momentum, angular velocity, angular momentum, and acceleration as well as scalar values such as speed, distance, and acceleration magnitude. Other motion characteristics may include oscillatory characteristics such as frequency, amplitude, and phase. In embodiments, direct measurement of one or more of the above motion characteristics may be used to determine values for other motion characteristics. For example, direct measurement of acceleration may be used to determine velocity and/or displacement. In some examples, stored system parameters may be used in such determinations. For example, knowledge of a system's mass combined with a measurement of acceleration may permit a determination of force.

The non-collocated motion characteristic sensor 107 may be, for example, an accelerometer. A motion characteristic sensor 107 implemented as an accelerometer may be a transducer specifically selected for detecting motion characteristics of the haptically enabled device 100 component and/or may be a transducer included within the haptically enabled device 100 for other purposes. For example, haptically enabled devices 100 frequently include accelerometers for tilt-control or step-counting purposes. Such an accelerometer may provide motion characteristics information as a motion characteristic sensor 107. In optional embodiments, a motion characteristic sensor 107 implemented as an accelerometer is oriented to detect motion in the same axis of movement as the vibration actuator 105 is oriented to produce movement.

Non-collocated motion characteristic sensors 107 may be implemented as other sensors within an haptically enabled device 100. For example, a camera of a haptically enabled device 100 may be mounted to a haptically activated component 173 and used to determine motion characteristics of the haptically activated component 173 (and any components coupled thereto) based on disturbances or image shake in captured images. In another example, a gyroscope of the haptically enabled device 100 may be employed as the motion characteristic sensor 107. Non-collocated motion characteristic sensors 107 may further include devices and or sensors, such as antennas, configured to determine location through the use of Wi-Fi triangulation or GPS.

Non-collocated motion characteristic sensors 107 may further include devices or sensors located remotely from, and not coupled to any component of, the haptically enabled device 100. For example, a remotely located camera, ultrasound, lidar, radar, or other sensor system may be used as a non-collocated motion characteristic sensor 107 for motion characteristic determination.

The haptically enabled device 100 is not limited to the use of one or one type of motion characteristic sensor 107. Multiple motion characteristic sensors 107 of the same or different types may be used in conjunction to provide a motion control signal having increased information.

A control circuit 102 for use in an embodiment hereof may be a collection of components configured for controlling the vibration actuators 105. In embodiments, a control circuit 102 may include an integrated circuit containing components dedicated to providing the haptic control functionality. For example, the control circuit 102 may include an application specific integrated circuit ("ASIC"), a programmable gate array ("PGA"), a field programmable gate array ("FPGA"), system on a chip ("SoC"), or other type of integrated circuit. In further embodiments, the control circuit 102 may be implemented entirely in hardware components and may include various electronics components configured to perform the functionality discussed herein. In further embodiments, the control circuit 102 may be at least partially implemented by a processor 108 that is configured to implement further functionality of the haptically enabled device 100. In other embodiments, the functionality of the control circuit 102 may be performed by any combination of hardware and software capable of performing the required computations.

Optional components of the haptically enabled device 100 further include a display screen 106, at least one processor 108, at least one memory unit 120, user input elements 110, audio outputs 109, and one or more communication units 112.

The haptically enabled device 100 may include one or more processors 108 and one or more memory units 120. The processors 108 may be programmed by one or more computer program instruction stored in the memory unit(s) 120. The functionality of the processor 108, as described herein, may be implemented by software stored in the memory unit(s) 120 or another computer-readable or tangible medium, and executed by the processor 108. As used herein, for convenience, the various instructions may be described as performing an operation, when, in fact, the various instructions program the processors 108 to perform the operation.

The various instructions described herein may be stored in the memory unit(s) 120, which may comprise random access memory (RAM), read only memory (ROM), flash memory, and/or any other memory suitable for storing software instructions. The memory unit(s) 120 may store the computer program instructions (e.g., the aforementioned instructions) to be executed by the processor 108 as well as data that may be manipulated by the processor 108.

User input elements 110 for use with embodiments hereof may include any elements suitable for accepting user input. These may include buttons, switches, dials, levers, touchscreens, touchpads, and the like. The user input elements 110 may further include peripherally connected devices, such as mice, joysticks, game controllers, keyboards, and the like. User input elements 110 may further include cameras, radar devices, lidar devices, ultrasound devices, and other devices configured to remotely capture user gestures.

A communication unit 112 in accordance with embodiment hereof may include one or more devices or components configured for external communication. The communication unit may include wired communication ports, such as USB ports, HDMI® ports, A/V ports, optical cable ports, and any other component or device configured to receive or send information in a wired fashion. The communication unit may further include wireless communication devices, such as BLUETOOTH® antennas, WI-FI® antennas, cellular antennas, infrared sensors, optical sensors, and any other device configured to receive and/or transmit information wirelessly. In further embodiments, the communication unit 112 may include ultrasound speakers and microphones configured to transmit information via ultrasonic soundwaves.

A display screen 106 for use with embodiments hereof may be a screen for providing a visual output to a user. The display screen 106 may include touchscreen capabilities (and therefore serve as a user input element 110 as well). The display screen 106 may be of any size, shape, or configuration to fit the needs of the haptically enabled device 100. In some embodiments of haptically enabled device 100, such as a wearable device configured for delivering haptic effects, no display screen 106 is required. In embodiments, the display screen 106 may include a head-mounted display screen, such as a VR, AR, or MR headset, goggles, and/or other VR/AR/MR display device. In embodiments, the display screen 106 may be projected, either onto a surface or for display in the air.

Audio outputs 109 include devices configured to provide an audio output to a user. Audio outputs 109 may include speakers as well as audio output ports, such as headphone jacks, configured for delivering an audio signal to a speaker or headphones.

Figure 2:
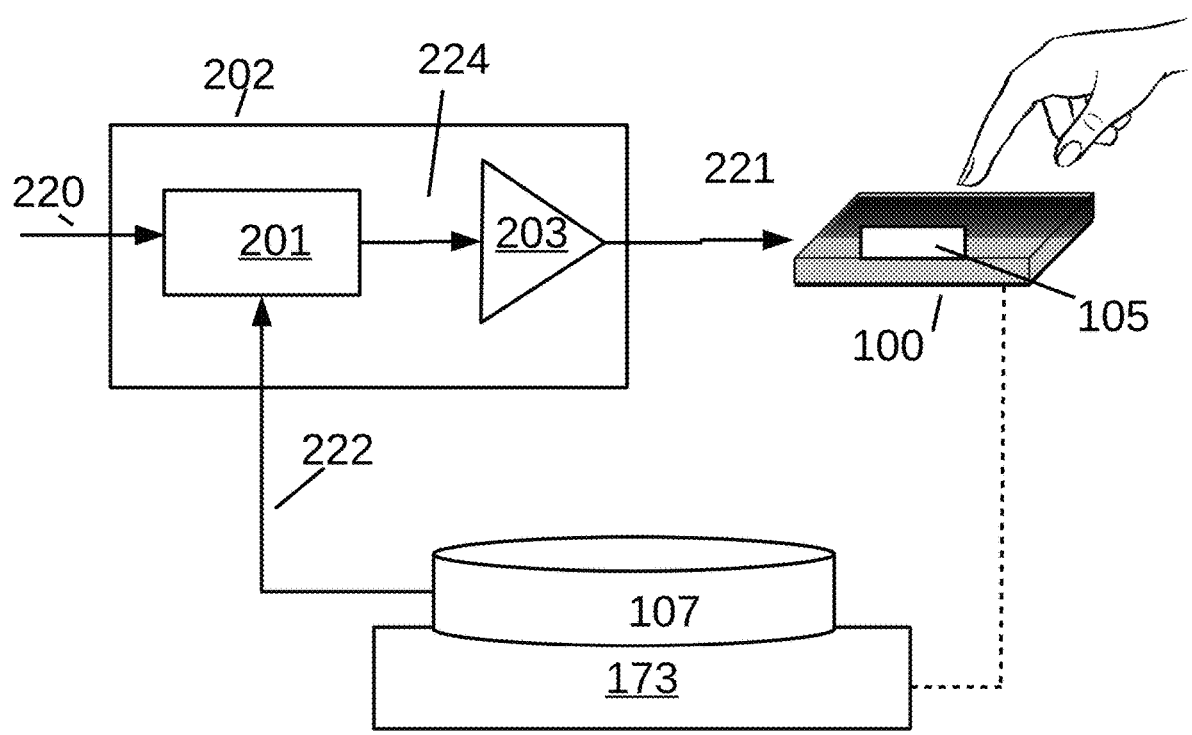
FIG. 2 is a schematic diagram illustrating a control circuit implemented via an integrated circuit according to embodiments hereof.

FIG. 2 illustrates operation of a control circuit 202 implemented as an integrated circuit. As illustrated in FIG. 2, the control circuit 202 is an integrated circuit including a microprocessor 201 and an amplifier 203. The control circuit 202 is configured to receive a desired effect signal 220 and a motion characteristic feedback signal 222 and to output a command signal 221 to a vibration actuator 105 of the haptically enabled device 100.

The desired effect signal 220 is received by the control circuit 202. The desired effect signal 220 represents a desired haptic output. The desired effect signal 220 is a time-varying signal that represents desired values of a motion characteristic measured over time. The desired effect signal 220 may be a time-varying signal of any motion characteristic, including each of those discussed herein. For example, the desired effect signal 220 may be an acceleration over time. The desired effect signal 220 may be representative of a desired motion characteristic of the haptically activated component 173 of the haptically enabled device 100. In embodiments, the desired effect signal 220 may represent a desired motion characteristic of a different component of the haptically enabled device 100 that is coupled to the haptically activated component 173. The desired effect signal 220 may be received from a processor 108 of the haptically enabled device 100 or may be received from a source external to the haptically enabled device 100. For example, where the haptically enabled device 100 is implemented as a wearable device, such as a bracelet, for providing haptic effects, the desired effect signal 220 may be delivered to the control circuit 202 from a processor of a larger system with which the wearable device is associated. In embodiments, the desired effect signal 220 may track the same parameter as the motion characteristic sensor 107, for e.g., the desired effect signal 220 may indicate a desired acceleration over time when the motion characteristic sensor 107 is an accelerometer. In further embodiments, the desired effect signal 220 may track a different parameter form the motion characteristic sensor 107. For example, the desired effect signal 220 may indicate a desired velocity over time when the motion characteristic sensor 107 is an accelerometer. In such embodiments, the control circuit 202 translates either the desired effect signal 220 or the motion characteristic feedback signal 222 such that they are in compatible units.

The motion characteristic feedback signal 222 is received from the motion characteristic sensor 107. The motion characteristic sensor 107, whether collocated or non-collocated, is configured to detect, measure, and/or determine at least one motion characteristic of the haptically activated component 173 and deliver the motion characteristic feedback signal 222 based on the motion characteristic to the control circuit 202. As discussed above, the motion characteristic sensor 107 may deliver a motion characteristic feedback signal 222 based on a directly measured motion characteristic, e.g., an acceleration measured by an accelerometer, and/or may deliver a motion characteristic feedback signal 222 derived from a measured motion characteristic, e.g., a velocity signal derived from an acceleration measured by an accelerometer.

The control circuit 202 receives both the desired effect signal 220 and the motion characteristic feedback signal 222 and outputs the command signal 221 to the vibration actuator 105. The microprocessor 201 compares the desired effect signal 220 to the motion characteristic feedback signal 222 to determine an error between them. Based on the error, the microprocessor 201 generates an unamplified command signal 224 that is amplified by the amplifier 203 to produce the command signal 221. The command signal 221 is output to the vibration actuator 105 to cause a haptic output. As the vibration actuator 105 is driven by the command signal 221, the haptic output of the vibration actuator 105 is measured by the motion characteristic sensor 107. In embodiments, a collocated motion characteristic sensor 107 measures motion characteristics of vibration actuator 105 components directly while, in further embodiments, a non-collocated motion characteristic sensor 107 measures motion characteristics of a haptically activated component 173 vibrationally coupled to the vibration actuator 105 of the haptically enabled device 100.

The control circuit 202 receives the motion characteristic feedback signal 222 and compares it to the desired effect signal 220 to continuously adjust the unamplified command signal 224, and thus the command signal 221 that is output to the vibration actuator 105, to minimize the error between the desired effect signal 220 and the motion characteristic feedback signal 222. In embodiments, the control circuit 202 further makes use of previous values of the desired effect signal 220 and/or the motion characteristic feedback signal 222 for the continuous adjustment of the unamplified command signal 224.

As used herein, continuous adjustment means that a signal output by the control circuit 202, e.g., the command signal 221, is adjusted on an ongoing basis during the output of that signal to produce a haptic effect or output. For digital applications, it is understood that continuous adjustment includes repeated discrete adjustments. Continuous adjustment, as used herein, does not include the use of measurements of haptic outputs for use in the adjustment of parameters for future haptic effects, even if performed on a regular basis. In embodiments, continuous adjustment may be performed via analog circuitry. In embodiments, continuous adjustment may be performed digitally at frequencies in excess of 1 kHz, 5 kHz, 10 kHz, and 20 kHz. In embodiments, the motion characteristic feedback signal 222 is sampled at a frequency equal to or in excess of the continuous adjustment frequency. These definitions of "continuous adjustment" apply to all embodiments and uses of this term discussed herein. The feedback control loop implemented by the control circuit 202 is discussed in greater detail with respect to FIG. 5.

In further embodiments, the control circuit 202 does not operate for the entirety of a haptic effect. As discussed above, vibration actuators 105 may be configured with minimal damping and thus may require active control to eliminate unintended effects as the vibration actuator 105 comes to a stop. Accordingly, in embodiments, the control circuit 202 operates to control the vibration actuator 105 after an initial period of open loop control. For example, the vibration actuator 105 may be provided with an initial command signal configured to initiate a haptic effect. The initial command signal may be predetermined and provided over a short duration (less than 10 ms) to initiate the haptic effect from the vibration actuator 105. After the initial short duration, the control circuit 202 may then employ active control via continuous adjustment, as described above, to eliminate any further haptic effects from the vibration actuator 105. Accordingly, the closed loop control of the control circuit 202 may be used, in some embodiments, for a portion of the limited duration haptic effect that is less than the entirety of the duration of the limited duration haptic effect.

Figure 3:
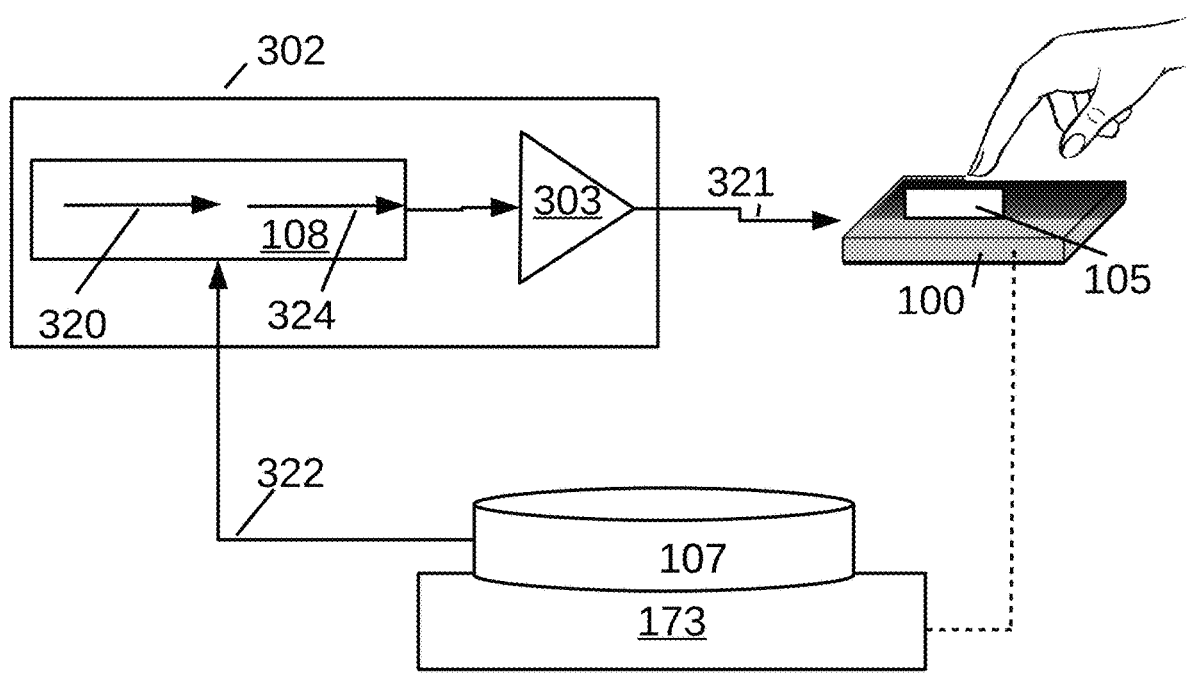
FIG. 3 is a schematic diagram illustrating a control circuit implemented via a processor according to embodiments hereof.

FIG. 3 illustrates a control circuit 302 implemented via a processor 108. As illustrated in FIG. 3, the control circuit 302 includes the processor 108 and an amplifier 303. The control circuit 302 is configured to receive a desired effect signal 320 and a motion characteristic feedback signal 322 and to output a command signal 321 to a vibration actuator 105 of the haptically enabled device 100.

The processor 108 of control circuit 302 is the same processor 108 configured to perform various other computing tasks for the haptically enabled device 100. For example, the processor 108 may be the main processing unit of the haptically enabled device 100, carrying out the majority of processing tasks, including running software applications, generating a graphical display, and other tasks. In the embodiment of FIG. 3, a portion of the processing power of processor 108 is dedicated to the control circuit 302.

The desired effect signal 320 is generated by the processor 108. As discussed above, the processor 108 is running several tasks for the haptically enabled device 100 and generates the desired effect signal 320 in response to a software application request. In further embodiments, the processor 108 may receive the desired effect signal 320 from a remotely located device or from another processor.

The motion characteristic feedback signal 322 is received by the processor 108 from the motion characteristic sensor 107. The processor 108 compares the motion characteristic feedback signal 322 and the desired effect signal 320 to determine an error between them. From the error, the processor 108 generates an unamplified command signal 324 that is amplified by the amplifier 303 before being output as the command signal 321 to the vibration actuator 105. The vibration actuator 105 produces a haptic output in response to the command signal 321. The haptic output is measured by the motion characteristic sensor 107 and the measured output is sent to the control circuit 302 as the motion characteristic feedback signal 322.

The control circuit 302 receives the motion characteristic feedback signal 322 and compares it to the desired effect signal 320 to provide continuous adjustment of the command signal 321 that is output to the vibration actuator 105 to minimize the error between the desired effect signal 320 and the motion characteristic feedback signal 322. In embodiments, the control circuit 302 may further use previous values of the desired effect signal 320 and/or the motion characteristic feedback signal 322, in the continuous adjustment. The feedback control loop implemented by the control circuit 302 is discussed in greater detail with respect to FIG. 5.

Figure 4:
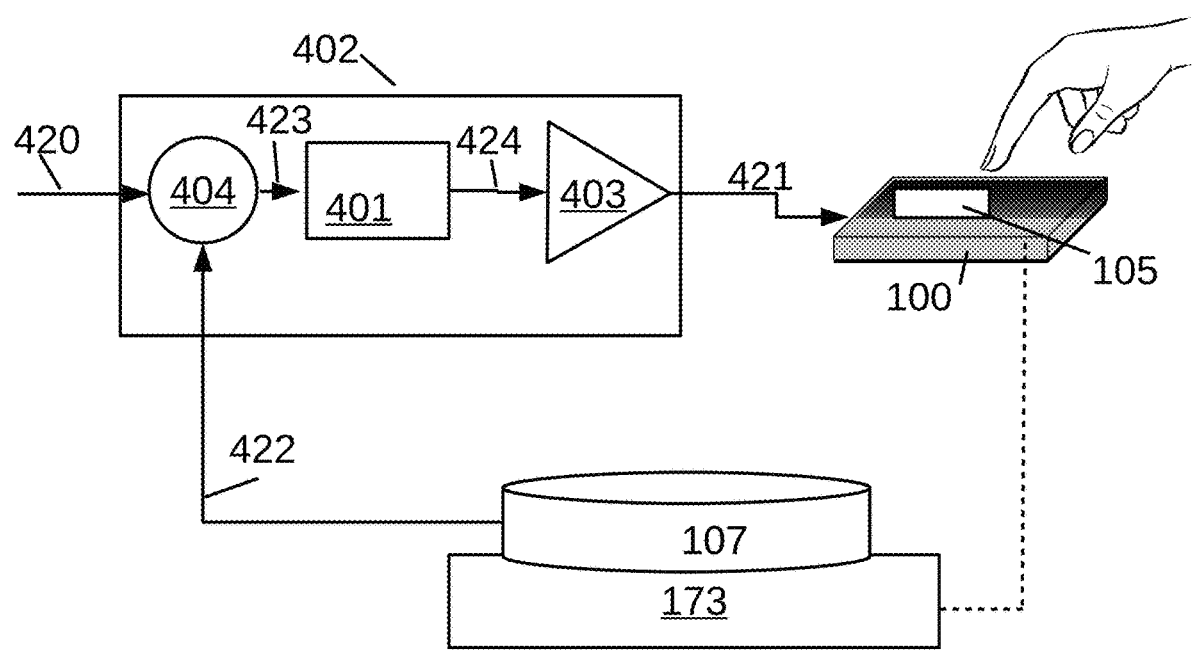
FIG. 4 is a schematic diagram illustrating a control circuit implemented via circuitry components according to embodiments hereof.

FIG. 4 illustrates a control circuit 402 implemented in hardware via circuitry components. As illustrated in FIG. 4, the control circuit 402 includes at least a comparing unit 404, a controller unit 401, and an amplifier unit 403.

The comparing unit 404 receives a desired effect signal 420 and a motion characteristic feedback signal 422 and, in response, outputs an error signal 423 indicating the difference between the desired effect signal 420 and the motion characteristic feedback signal 422. The comparing unit 404 may be implemented, for example, by circuitry components such as operational amplifiers (op-amps), resistors, diodes, capacitors, inductors, transistors, and any other suitable component. In an embodiment, for example, the comparing unit may be implemented by use of a differential amplifier circuit, The error signal 423 is received by a controller unit 401, which outputs an unamplified command signal 424. The controller unit 401 determines the unamplified command signal 424 based on the error signal 423. The controller unit 401 is configured to reduce the error signal 423. Implementation of the controller unit 401 depends on the control scheme to be implemented. The controller unit 401 may be implemented by circuitry components such as operational amplifiers (op-amps), resistors, diodes, capacitors, inductors, transistors, and any other suitable component.

The unamplified command signal 424 is amplified by the amplifier 403 before being output as a command signal 421 to the vibration actuator 105. The amplifier 403 may be implemented by circuitry components such as operational amplifiers (op-amps), resistors, diodes, capacitors, inductors, transistors, and any other suitable component. The command signal 421 is received by the vibration actuator 105 which responds by producing a haptic output. The haptic output is measured by the motion characteristic sensor 107, which provides a motion characteristic feedback signal 422 back to the comparing unit 404.

Accordingly, the control circuit 402 operates to provide continuous adjustment of the command signal 421 in response to the motion characteristic feedback signal 422 produced by the motion characteristic sensor 107. The continual adjustments to the command signal 421 are performed to minimize the error between the desired effect signal 420 and the motion characteristic feedback signal 422. In embodiments, the control circuit 402 may further use previous values of the desired effect signal 420 and/or the motion characteristic feedback signal 422, in the continuous adjustment. The feedback control loop implemented by the control circuit 402 is discussed in greater detail with respect to FIG. 5.

Figure 5:
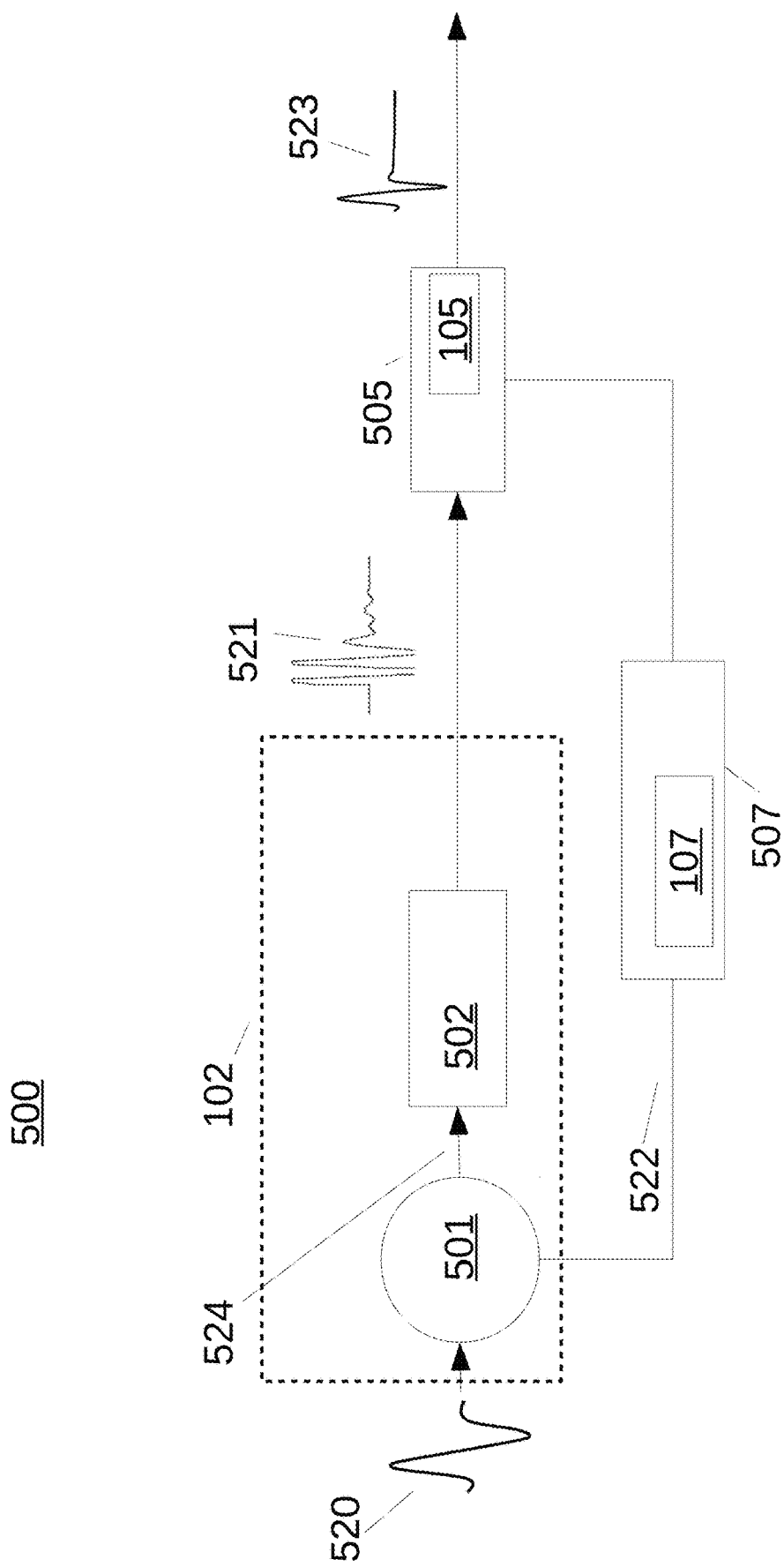
FIG. 5 is a diagram illustrating operation of a feedback loop according to embodiments hereof.

FIG. 5 illustrates operation of a feedback loop 500 consistent with embodiments hereof. The feedback loop 500 is implemented by the control circuit 102 in any of the specific control circuit embodiments 202, 302, 402, discussed herein. In further embodiments, the feedback loop 500 may implemented by any combination of software, hardware, and firmware capable of carrying out the functionality of the feedback loop 500. The feedback loop 500 includes a comparator block 501, a control block 502, a system block 505, and a feedback block 507.

The comparator block 501 and the control block 502 are implemented by the control circuit 102, which may be implemented by any one of the control circuits 202, 302, 402, as well as other suitable components. The comparator block 501 receives a desired effect signal 520 and a motion characteristic feedback signal 522. The comparator block 501 compares the desired effect signal 520 and the motion characteristic feedback signal 522 to produce an error signal 524. The control block 502 receives the error signal 524 and generates the command signal 521, which is provided to the vibration actuator 105 of the system block 505.

The control block 502 may implement any suitable control scheme. For example, the control block 502 may implement a lead compensation controller. Lead compensation control may be advantageous when implemented with an LRA due to lag in the LRA system at resonant frequencies. When the LRA is excited at a resonant frequency, the initial frequency response demonstrates phase lag with respect to the input signal. Lead compensation control may act to counter this lag and reduce the error between the desired effect signal 520 and the motion characteristic feedback signal 522. In other examples, the control block 502 may implement a proportional controller, a proportional derivative (PD) controller, a proportional integral derivative (PID) controller, a proportional integral (PI) controller, a lead-lag compensation controller, and/or any other appropriate controller.

In response to receipt of the command signal 521, the vibration actuator 105 is activated, causing the system block 505 to produce the output haptic effect 523. The system block 505 includes the vibration actuator 105 and represents the controlled components of the haptically enabled device 100. The transfer function of the system block 505 depends on the structure and location of the various system components. For example, where the vibration actuator 105 and the motion characteristic sensor 107 are collocated, the system block 505 represents the haptically activated component 173 of the vibration actuator 105 that is measured by the motion characteristic sensor 107. In an example, the motion characteristic sensor 107 may measure displacement of an oscillating mass of the vibration actuator 105. Where the vibration actuator 105 and the motion characteristic sensor 107 are non-collocated, the system block 505 represents the collection of components forming the actuated system coupled to the haptically activated component 173 that is measured by the motion characteristic sensor 107. For example, where the motion characteristic sensor 107 is an accelerometer coupled to a device housing 101 as the haptically activated component 173, the system block 505 represents the structural components that are vibrationally coupled to the vibration actuator 105 and the motion characteristic sensor 107. In another example, where the motion characteristic sensor 107 is a camera located remotely from the haptically enabled device 100, the system block 505 represents the vibrating components vibrationally coupled to the vibration actuator 105 that are measured by the motion characteristic sensor 107.

An output haptic effect 523 is received by the feedback block 507. The feedback block 507 includes the one or more motion characteristic sensors 107 and represents the feedback pathway from the output haptic effect 523 to the motion characteristic feedback signal 522.

The feedback loop 500 thus operates to provide closed-loop feedback control of the vibration actuator 105.

The feedback loop 500 is advantageous when applied to the production of limited duration haptic effects, i.e., effects having a duration of less than 50 ms. In embodiments, limited duration haptic effects may be between 5 and 50 ms and use between 1 and 10 oscillations of a vibration actuator 105. Because of the limited duration of the haptic effects produced by embodiments hereof, the feedback loop 500 operates to provide continuous adjustment of the command signal 521. Such continuous adjustment means that the command signal 521 is adjusted based on the motion characteristic feedback signal 522 many times during even a very short haptic effect. In embodiments, the motion characteristic feedback signal 522 may capture motion of the system block 505 at a sampling frequency in excess of 1 kHz, in excess of 5 kHz, in excess of 10 kHz, and/or in excess of 20 kHz. The control block 502 may perform updates to the command signal 521 at the same rate as the sampling frequency of the motion characteristic feedback signal 522. In embodiments, the feedback loop 500 may be implemented in analog circuitry and thus may provide continuous adjustments to the command signal 521. In embodiments, the command signal 521 (as well as the command signals 221, 321, 421 discussed with respect to previous embodiments) includes a pulse width modulated (PWM) signal or is converted to a PWM signal prior to input to the vibration actuator 105. Accordingly, the frequency of the command signal 521 (as well as the command signals 221, 321, 421 discussed with respect to previous embodiments) may be an integer divisor of the frequency of the PWM signal. PWM signals consistent with embodiments hereof may be range from 10 kHz to 1 mHz.

As discussed above, vibration actuators 105 consistent with embodiments hereof represent an underdamped system. When an excitation signal to such a vibration actuator 105 ceases, the vibration actuator 105 will continue to oscillate for several cycles before coming to rest. Feedback loop 500 is configured to minimize this aspect of the vibration actuator 105 and to add controlled damping to the system so as to provide a sharp cut-off or abrupt stop to a haptic effect.

The control loop 500 may be understood to provide controlled damping to a vibration actuator 105 to cause a limited duration haptic effect that is produced with a sharp cut-off or end to the effect.

Figure 6A:
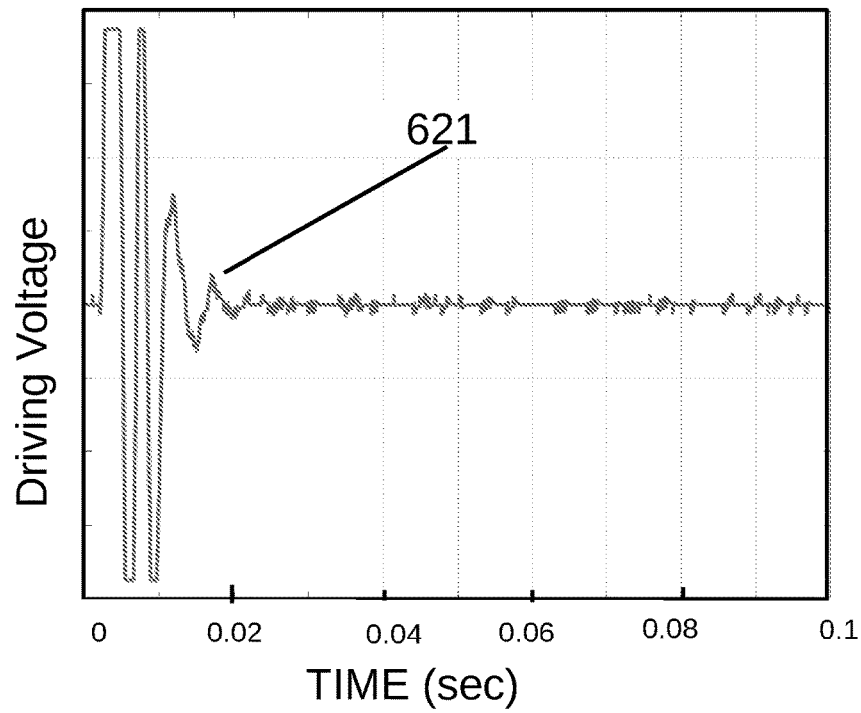
FIGS. 6A and 6B illustrate a control signal and a motion characteristic feedback signal of a vibration actuator during a limited duration haptic effect.
Figure 6B:
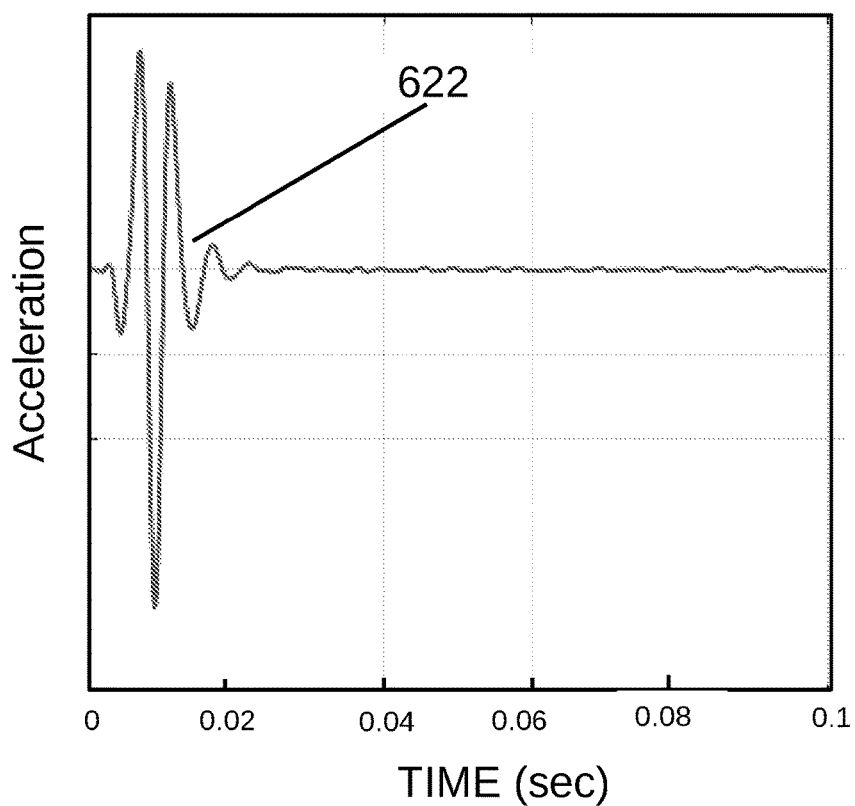

FIGS. 6A and 6B respectively illustrate an example command signal 621 and motion characteristic feedback signal 622 captured during a limited duration haptic effect including excitation of a linear resonant actuator. As illustrated in FIGS. 6A and 6B, the command signal 621 includes three full cycles over a time period of less than 20 ms. In response, the motion characteristic feedback signal 622, which is an acceleration signal in this example, also includes three full cycles over a similar time period. It can be seen from these figures that the amplitude of the motion characteristic feedback signal 622 requires longer to reach a maximum than the command signal 621 that it is responding to.

FIG. 7A illustrates an x-axis linear resonant actuator 705 (xLRA) consistent with embodiments hereof. The xLRA 705 includes a casing 701, a moving mass 702, a spring 703, and a driver 704. In embodiments, the driver 704 is a voice coil configured to induce a magnetic field that interacts with a magnet of the moving mass 702. The xLRA 705 is configured such that the moving mass 702 moves along an x-axis 711 or y-axis 712 of a haptically enabled device 700 with which it is incorporated. The x-axis 711 of the haptically enabled device 700 represents an axis parallel to a length or width dimension of the haptically enabled device 700. Haptically enabled devices 700 are frequently configured with length and width dimensions that are significantly larger than a depth (z-axis 713) dimension. In the xLRA 705, the mass 702 is configured to travel in a direction that coincides with at least one of the two largest dimensions (e.g., length and/or width) of the xLRA 705 itself. This feature may permit the moving mass 702 to travel a relatively large distance compared to its size, and thus to take advantage of the larger length or width dimensions of the haptically enabled device 700. Although referred to and configured for use in the "x-axis," the defining structural feature of the xLRA 705 is the direction of travel of the mass with respect to the dimensions of the xLRA 705, not the specific orientation in which it is used. In haptically enabled devices 700 of differing dimensions, the xLRA 705 may be oriented in any direction.

FIG. 7B illustrates a z-axis linear resonant actuator 755 (zLRA) consistent with embodiments hereof. The zLRA 755 includes a housing 751, a moving mass 752, a spring 753, and a driver 754. In embodiments, the driver 754 is a voice coil configured to induce a magnetic field that interacts with a magnet of the moving mass 752. The zLRA 755 is configured such that the moving mass 752 moves along a z-axis 763 of a haptically enabled device 750 with which it is incorporated. The z-axis 763 of the haptically enabled device 755 represents an axis parallel to a depth dimension of the haptically enabled device 750. Haptically enabled devices 750 are frequently configured with length (x-axis 761) and width dimensions (y-axis 762) that are significantly larger than a depth (z-axis 763) dimension. In the zLRA 755, the mass 752 is configured to travel in a direction that coincides with the smallest dimension (e.g., depth), of the zLRA 755 itself. This feature results in the moving mass 752 traveling a relatively short distance compared to its size, and thus to fit within the relatively shorter depth dimension of the haptically enabled device 750. Although referred to and configured for use in the "z-axis," the defining structural feature of the zLRA 755 is the relatively short length of travel of the mass, not the specific orientation in which it is used. In haptically enabled devices 750 of differing dimensions, the zLRA 755 may be oriented in any direction.

Figure 8:
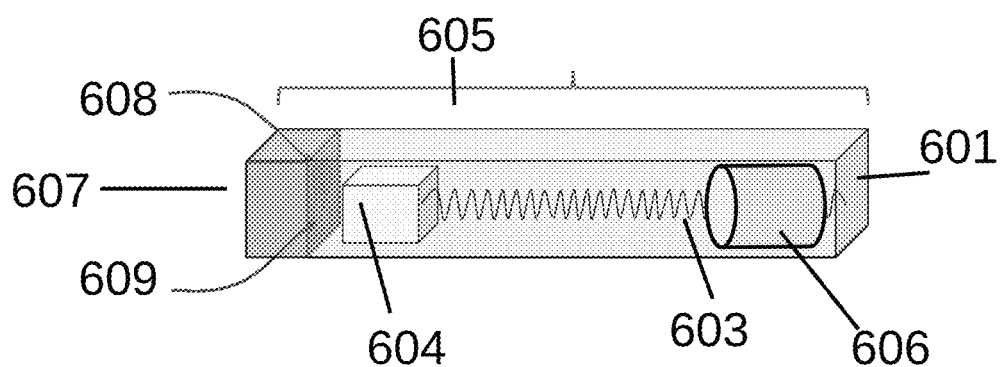
FIG. 8 illustrates an actuator and collocated sensor embodiment incorporating light emitting diodes.

FIG. 8 illustrates a vibration actuator 605 including a collocated motion characteristic sensor 607. As illustrated in FIG. 8, the vibration actuator 605 includes a collocated motion characteristic sensor 607 comprising an emitter diode 608 and a receiver diode 609. The vibration actuator 605 further comprises a casing 601, a spring 603, a mass 604, and a driver 606. FIG. 8 is intended to illustrate the principal of operation of the collocated motion characteristic sensor 607. FIG. 8 illustrates some components of the vibration actuator 605 and is not intended to include all components, the exact configuration of the components, or to be drawn to scale.

The vibration actuator 605 operates by action of the driver 606 driving the mass 604 to oscillate on the spring 603. When driven at the resonant frequency of the spring-mass system, the vibrations produced by the vibration actuator 605 are enhanced. In an embodiment, the vibration actuator 605 is a linear resonant actuator and the driver 606 is a voice coil configured to drive the mass 604 via a magnet (not shown) attached to the mass 604.

The collocated motion characteristic sensor 607 is configured to determine the position of the mass 604, which therefore serves as a haptically activated component. The emitting diode 608 emits light and the reflecting diode 609 receives light reflected from the mass 604. Based on the properties of the reflected light, the collocated motion characteristic sensor 607 determines at least one property of the mass 604. For example, the motion characteristic sensor 607 may determine the distance, i.e., displacement, between the collocated motion characteristic sensor 607 and the mass 604 based on the intensity of the reflected light. In another example, the speed or velocity of the mass 604 may be determined based on the frequency of the reflected light according to the doppler effect. Accordingly, the collocated motion characteristic sensor 607 may directly measure a motion characteristic of the mass 604 based on reflected light properties. The measured motion characteristics may be used to determine other, related, characteristics. For example, direct measurement of the displacement of the mass 604 may be used to determine vector values such as displacement, velocity, momentum, and acceleration as well as scalar values such as speed, distance, and acceleration magnitude. Furthermore, the location of the mass 604 may be determined. Displacement measurements of the mass 604 may further be used to determine oscillation frequency, amplitude, and phase.

In FIG. 8, the vibration actuator 605 includes a single collocated motion characteristic sensor 607 measuring light reflected from the mass 604. This embodiment is illustrative of the use of light emitting diode 608 and receiving diode 609 in determining motion characteristics of the mass 604. In further embodiments, more than one collocated motion characteristic sensor 607 may be used. In further embodiments, the light emitting diode 608 and receiving diode 609 of the collocated motion characteristic sensor 607 may be located remote from each other within the casing 601. In further embodiments, the vibration actuator 605 may utilizing a rotating mass 604 rather than linear movement. In such an embodiment, the collocated motion characteristic sensor 607 may further measure or determine angular velocity and/or angular momentum.

Figure 9:
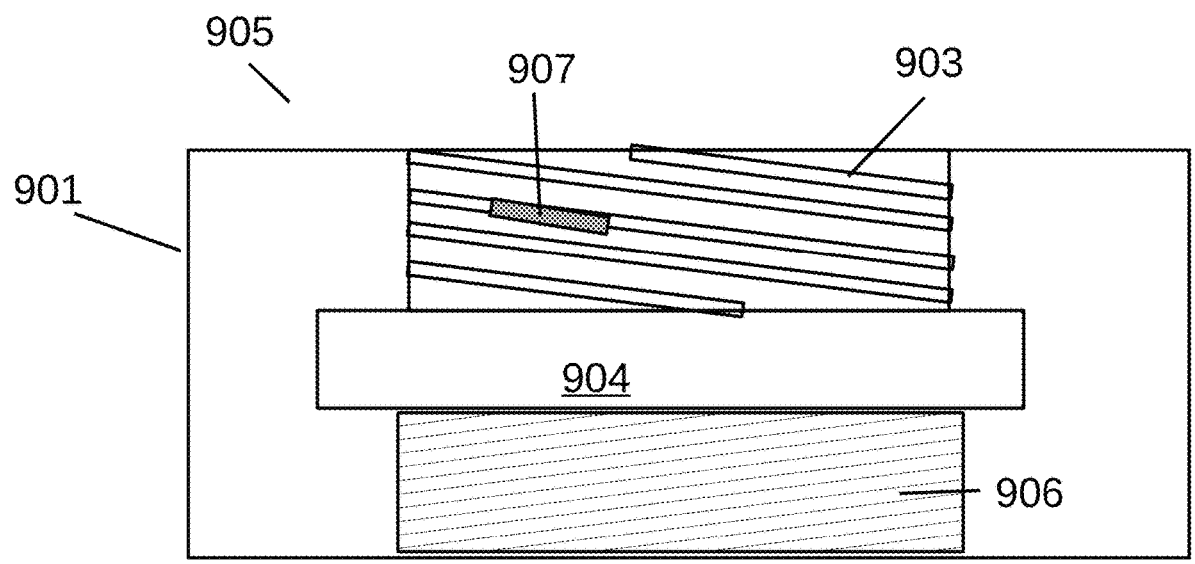
FIG. 9 illustrates an actuator and collocated sensor embodiment incorporating a strain detection sensor.

FIG. 9 illustrates a vibration actuator 905 including a collocated motion characteristic sensor 907 according to an embodiment hereof. The vibration actuator 905 further comprises a casing 901, a spring 903, a mass 904, and a driver 906. FIG. 9 is intended to illustrate the principal of operation of the collocated motion characteristic sensor 907. FIG. 9 illustrates some components of the vibration actuator 905 and is not intended to include all components, the exact configuration of the components, or to be drawn to scale.

The vibration actuator 905 operates by action of the driver 906 driving the mass 904 to oscillate on the spring 903. When driven at the resonant frequency of the spring-mass system, the vibrations produced by the vibration actuator 905 are enhanced. In an embodiment, the vibration actuator 905 is a linear resonant actuator, the spring 903 is a wave spring, and the driver 906 is a voice coil configured to drive the mass 904 via a magnet (not shown) attached to the mass 904.

The collocated motion characteristic sensor 907 is a strain detection sensor configured to measure the strain in the spring 903, which serves as the haptically activated component 173. Measurement of the strain of the spring 903 may be used to determine the displacement of the spring 903 and therefore the displacement of the mass 904, and thus vector values such as displacement, velocity, momentum, and acceleration of the mass 904 as well as scalar values such as speed, distance, and acceleration magnitude of the mass 904. Furthermore, the location of the mass 904 may be determined.

The collocated motion characteristic sensor 907 may be used in any actuator that includes a spring, including those that employ wave springs, leaf springs, and any other type of elastic member.

In an embodiment, the collocated motion characteristic sensor 907 is a strain gauge secured to the spring 903, configured to measure strain according to a change in resistance related to the elongation or compression of the spring 903. In embodiments, the collocated motion characteristic sensor 907 may comprise any other type of strain detection sensor. In embodiments, the collocated motion characteristic sensor 907 may be a strain sensor configured to detect or determine strain in the spring 903 based on an electrical resistance measurement of the spring 903 itself.

Figure 10:
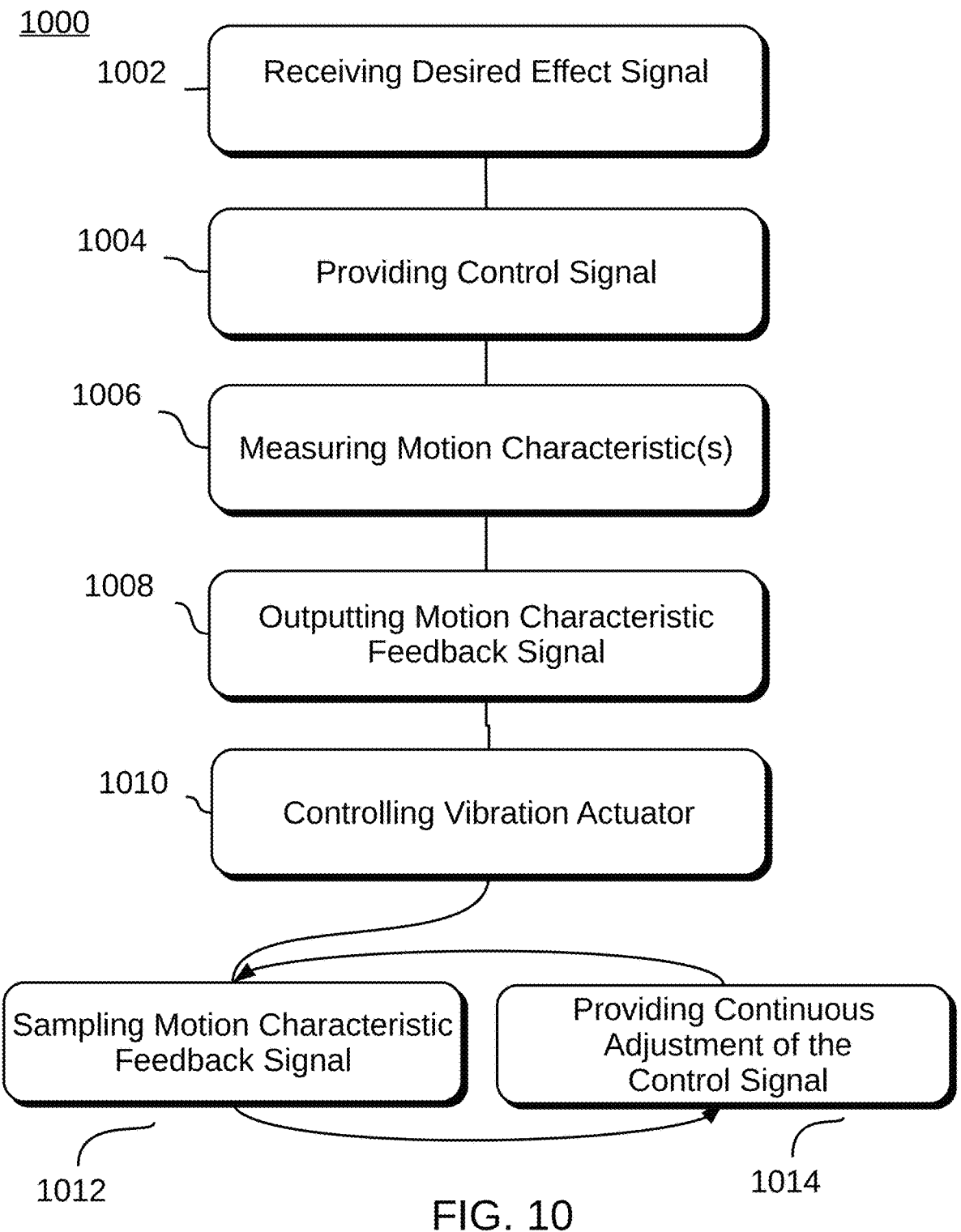
FIG. 10 illustrates a flow chart of a process for controlling a vibration actuator.

FIG. 10 depicts a flow chart showing a process 1000 of providing closed-loop feedback control of a vibration actuator. The process 1000 may be performed by any of the control circuits 102, 202, 302, 402 discussed herein in conjunction with any combination of other features and components discussed herein. Accordingly, the process 1000 employs any vibration actuators 105, 605, 705, 755, 905 as discussed herein. The process 1000 employs at least one sensor, which may include any motion characteristic sensor 107, 607, 907 as discussed herein. The process 1000 is performed by hardware components, firmware components, software components, and/or by a combination of these, as described above. The closed loop feedback control implemented by process 1000 may be understood as providing controlled damping to the controlled system so as to provide a sharp cut-off or abrupt stop to a haptic effect. As discussed above, closed loop feedback control may be used for only a portion of a delivered haptic effect, for example, to eliminate excess vibration at the end of a haptic effect. Such embodiments are consistent with the process 1000 discussed below.

In an operation 1002, the process 1000 includes receiving a desired effect signal. The desired effect signal represents a haptic effect that the haptically enabled device is attempting to produce. The goal of the process 1000 is to reduce the error between the measured haptic effect, i.e., as measured by a motion characteristic feedback signal, and a haptic effect that is intended to be produced by the desired effect signal. Embodiments discussed herein are well suited for producing sharp haptic effects of less than 50 ms, less than 30 ms, less than 20 ms, less than 15 ms, and less than 10 ms.

In an operation 1004, the process 1000 includes providing a control signal to cause the vibration actuator to deliver the limited duration haptic effect. An initial value of the control signal is selected to initiate motion of the vibration actuator and cause the limited duration haptic effect. The initial value of the control signal is determined according to the desired effect signal and the known characteristics of the feedback system, including at least the vibration actuator, the components that it is coupled to, and the sensor. Although feedback from the sensor will act to minimize errors between the desired effect signal and the motion characteristic signal (i.e., the measured haptic effect), selecting an initial control signal value close to what is necessary to achieve the desired output serves to minimize errors in the early portions of the haptic effect.

In an operation 1006, the process 1000 includes measuring, by a sensor, one or more motion characteristics of a haptically activated component of the haptically enabled device. In embodiments, the sensor is a motion characteristic sensor as discussed herein. Motion characteristics may include vector values such as displacement, velocity, momentum, angular velocity, angular momentum, and acceleration as well as scalar values such as speed, distance, and acceleration magnitude. The motion characteristic is measured based on the movement of a haptically activated component of the haptically enabled device. The motion characteristic may be measured directly or may be derived from a directly measured value. The haptically activated component may be a component of a vibration actuator and/or may be another component of the haptically enabled device. The motion characteristic sensor may be vibrationally coupled, directly or indirectly to the haptically activated component or may be located remote from the haptically activated component.

In an operation 1008, the process 1000 includes outputting, by the sensor, a motion characteristic feedback signal indicative of the motion characteristic that is used for feedback control of the vibration actuator.

In an operation 1010, the process 1000 includes controlling the vibration actuator to produce the limited duration haptic effect. Control of the motion characteristic is performed with a control circuit, which may comprise one or more of an integrated circuit including a microprocessor, a processor of the haptically enabled device, and/or circuitry components. Controlling the motion characteristic is carried out by a feedback loop encompassing the operations 1012-1014, as explained below.

In an operation 1012, the process 1000 includes sampling the motion characteristic feedback signal. The motion characteristic feedback signal output by the sensor is sampled by the control circuit. In some embodiments, the control circuit operates in analog and receives the motion characteristic feedback signal but does not discretely sample it. Due to the limited duration nature of the haptic effects to be produced and the need to have a fast settling time for the production of a sharp effect, feedback control adjustments must be performed at a high rate. The motion characteristic feedback signal is sampled at a rate high enough to allow for a high rate of feedback control adjustments. Accordingly, the motion characteristic feedback signal is sampled at rates exceeding 1 kHz, 5 kHz, 10 kHz, and 20 kHz. The specific sampling rate selected among these may be determined according to requirements of the limited duration haptic effect as well as characteristics and capabilities of control circuit components.

In an operation 1014, the process 1000 includes providing continuous adjustment of the control signal according to the motion characteristic feedback signal and the desired effect signal while continuously providing the control signal. The continuous adjustment of the control signal minimizes an error between the desired effect signal and the motion characteristic feedback signal. The motion characteristic feedback signal measures the output haptic effect and thus the continuous adjustment serves to control the vibration actuator to control the output haptic effect. The feedback system reduces and/or minimizes errors between the intended haptic effect, represented by the desired effect signal, and the output haptic effect, represented by the motion characteristic signal. In embodiments, continuous adjustment of the control signal is performed at a rate equaling that of the rate at which the motion characteristic feedback signal is sampled.

The above describes an illustrative flow of an example process 1000 of providing closed loop control of a vibration actuator to produce limited duration haptic effects, according to embodiments described herein. The process as illustrated in FIG. 10 is exemplary only, and variations exist without departing from the scope of the embodiments disclosed herein. The steps may be performed in a different order than that described, additional steps may be performed, and/or fewer steps may be performed.

Additional Discussion of Various Embodiments

Embodiment 1 is a haptically enabled device, comprising:
a vibration actuator;
a sensor, configured to measure a motion characteristic including at least one of acceleration, velocity, and displacement of a haptically activated component of the haptically enabled device, and to output a motion characteristic feedback signal; and
a control circuit comprising an integrated circuit including a microprocessor configured to control the vibration actuator to produce a limited duration haptic effect of less than 20 ms by: receiving a desired effect signal, the desired effect signal representing the limited duration haptic effect, providing a control signal to activate the vibration actuator, sampling the motion characteristic feedback signal at a sampling frequency of at least 10 kHZ, and providing continuous adjustment of the control signal at the sampling frequency according to the motion characteristic feedback signal and the desired effect signal while continuously providing the control signal, wherein providing continuous adjustment of the control signal minimizes an error between the desired effect signal and the motion characteristic feedback signal.

Embodiment 2 includes the haptically enabled device of embodiment 1, wherein providing continuous adjustment of the control signal at the sampling frequency is performed further according to a previous value of at least one of the desired effect signal and the motion characteristic feedback signal.

Embodiment 3 includes the haptically enabled device of embodiment 1 or 2, wherein
the vibration actuator is coupled to the haptically activated component of the device and configured to deliver haptic outputs to the haptically enabled device via the haptically activated component,
the sensor includes an accelerometer coupled to the haptically activated component of the haptically enabled device, and
the motion characteristic feedback signal is an acceleration signal.

Embodiment 4 includes the haptically enabled device of any one of embodiments 1-3, wherein the sensor includes a camera mounted to the haptically activated component and the motion characteristic feedback signal is based on image shake.

Embodiment 5 includes the haptically enabled device of any one of embodiments 1-4, wherein the haptically activated component is a sub-component of the vibration actuator.

Embodiment 6 includes the haptically enabled device of embodiment 5, wherein the sub-component is a mass of the vibration actuator and the sensor includes an emitting diode and a receiving diode configured to measure displacement of the mass.

Embodiment 7 includes the haptically enabled device of embodiment 5, wherein the sub-component is a mass of the vibration actuator and the sensor is a strain detection sensor configured to measure a strain of a spring of the vibration actuator.

Embodiment 8 includes the haptically enabled device of any one of embodiments 1-7, wherein providing continuous adjustment of the control signal is performed according to proportional derivative control.

Embodiment 9 includes the haptically enabled device of any one of embodiments 1-7, wherein providing continuous adjustment of the control signal is performed according to lead compensation control.

Embodiment 10 includes the haptically enabled device of any one of embodiments 1-9, wherein providing continuous adjustment of the control signal occur for a portion of the limited duration haptic effect that is less than the entirety of the duration of the limited duration haptic effect.

Embodiment 11 includes the haptically enabled device of any one of embodiments 1-10, wherein the vibration actuator includes at least one of a linear resonant actuator, a macrofiber composite actuator, and a piezoceramic actuator.

Embodiment 12 is a method of controlling a vibration actuator of a haptically enabled device to produce a limited duration haptic effect, the method comprising:
receiving, by a control circuit comprising an integrated circuit including a microprocessor, a desired effect signal, the desired effect signal representing the limited duration haptic effect, the limited duration haptic effect being less than 20 ms;
providing, by the control circuit, a control signal to activate the vibration actuator;
measuring, by a sensor over time, a motion characteristic including at least one of acceleration, velocity, and displacement of a haptically activated component of the haptically enabled device;
outputting, by the sensor, a motion characteristic feedback signal indicative of the motion characteristic; and
controlling the vibration actuator to provide the limited duration haptic effect by sampling the motion characteristic feedback signal at a sampling frequency of at least 10 kHZ, and providing continuous adjustment of the control signal at the sampling frequency according to the motion characteristic feedback signal and the desired effect signal while providing the control signal, wherein providing continuous adjustment of the control signal minimizes an error between the desired effect signal and the motion characteristic feedback signal.

Embodiment 13 includes the method of embodiment 12, wherein providing continuous adjustment of the control signal at the sampling frequency is performed further according to a previous value of at least one of the desired effect signal and the motion characteristic feedback signal.

Embodiment 14 includes the method of embodiment 12 or 13, wherein
providing the control signal to activate the vibration actuator delivers a haptic output to the haptically enabled device via a haptically activated component coupled to the vibration actuator, and
measuring the motion characteristic includes measuring acceleration of the haptically activated component by the sensor, the sensor including an accelerometer coupled to the haptically activated component.

Embodiment 15 includes the method of any one of embodiments 12-14, wherein measuring the motion characteristic includes measuring the motion characteristic based on image shake recorded by the sensor, the sensor including a camera mounted to the component.

Embodiment 16 includes the method of any one of embodiments 12-15, wherein the haptically activated component is a sub-component of the vibration actuator.

Embodiment 17 includes the method of embodiment 16, wherein the sub-component is a mass of the vibration actuator and measuring the motion characteristic includes measuring displacement of the mass by the sensor, the sensor including an emitting diode and a receiving diode.

Embodiment 18 includes the method of embodiment 16, wherein the sub-component is a mass of the vibration actuator and measuring the motion characteristic includes measuring the strain of a spring of the vibration actuator.

Embodiment 19 includes the method of any one of embodiments 12-18, wherein providing continuous adjustment of the control signal is performed according to proportional derivative control.

Embodiment 20 includes the method of any one of embodiments 12-19, wherein providing continuous adjustment of the control signal is performed according to lead compensation control.

Embodiment 21 includes the method of any one of embodiments 12-20, wherein providing continuous adjustment of the control signal occur for a portion of the limited duration haptic effect that is less than the entirety of the duration of the limited duration haptic effect.

Embodiment 22 includes the method of any one of embodiments 12-21, wherein the vibration actuator includes at least one of a linear resonant actuator, a macrofiber composite actuator, and a piezoceramic actuator.

Thus, there are provided systems, devices, and methods of using closed loop control systems to provide precise control of vibration actuators during limited duration haptic effects. The precise control methods enabled by embodiments herein permit the production of limited duration haptic effects having sharp or abrupt finishes. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. Stated another way, aspects of the above methods of rendering haptic effects may be used in any combination with other methods described herein or the methods can be used separately. All patents and publications discussed herein are incorporated by reference herein in their entirety.

What is claimed is:

1. A haptically enabled device, comprising:
a vibration actuator;
a sensor, configured to measure a motion characteristic including at least one of acceleration, velocity, and displacement of a haptically activated component of the haptically enabled device, and to output a motion characteristic feedback signal;
a control circuit comprising an integrated circuit including a microprocessor configured to control the vibration actuator to produce a limited duration haptic effect of less than 20 ms by:
receiving a desired effect signal, the desired effect signal representing the limited duration haptic effect,
providing a control signal to activate the vibration actuator,
sampling the motion characteristic feedback signal at a sampling frequency of at least 10 kHZ, and
providing continuous adjustment of the control signal at the sampling frequency according to the motion characteristic feedback signal and the desired effect signal while continuously providing the control signal,
wherein providing continuous adjustment of the control signal minimizes an error between the desired effect signal and the motion characteristic feedback signal.

2. The haptically enabled device of claim 1, wherein providing continuous adjustment of the control signal at the sampling frequency is performed further according to a previous value of at least one of the desired effect signal and the motion characteristic feedback signal.

3. The haptically enabled device of claim 1, wherein
the vibration actuator is coupled to the haptically activated component of the device and configured to deliver haptic outputs to the haptically enabled device via the haptically activated component,
the sensor includes an accelerometer coupled to the haptically activated component of the haptically enabled device, and
the motion characteristic feedback signal is an acceleration signal.

4. The haptically enabled device of claim 1, wherein the sensor includes a camera mounted to the haptically activated component and the motion characteristic feedback signal is based on image shake.

5. The haptically enabled device of claim 1, wherein the haptically activated component is a sub-component of the vibration actuator.

6. The haptically enabled device of claim 5, wherein the sub-component is a mass of the vibration actuator and the sensor includes an emitting diode and a receiving diode configured to measure displacement of the mass.

7. The haptically enabled device of claim 5, wherein the sub-component is a mass of the vibration actuator and the sensor is a strain detection sensor configured to measure a strain of a spring of the vibration actuator.

8. The haptically enabled device of claim 1, wherein providing continuous adjustment of the control signal is performed according to proportional derivative control.

9. The haptically enabled device of claim 1, wherein providing continuous adjustment of the control signal is performed according to lead compensation control.

10. The haptically enabled device of claim 1, wherein providing continuous adjustment of the control signal occur for a portion of the limited duration haptic effect that is less than the entirety of the duration of the limited duration haptic effect.

11. The haptically enabled device of claim 1, wherein the vibration actuator includes at least one of a linear resonant actuator, a macrofiber composite actuator, and a piezoceramic actuator.

12. A method of controlling a vibration actuator of a haptically enabled device to produce a limited duration haptic effect, the method comprising:
receiving, by a control circuit comprising an integrated circuit including a microprocessor, a desired effect signal, the desired effect signal representing the limited duration haptic effect, the limited duration haptic effect being less than 20 ms;
providing, by the control circuit, a control signal to activate the vibration actuator;
measuring, by a sensor over time, a motion characteristic including at least one of acceleration, velocity, and displacement of a haptically activated component of the haptically enabled device;
outputting, by the sensor, a motion characteristic feedback signal indicative of the motion characteristic; and controlling the vibration actuator to provide the limited duration haptic effect by sampling the motion characteristic feedback signal at a sampling frequency of at least 10 kHZ, and providing continuous adjustment of the control signal at the sampling frequency according to the motion characteristic feedback signal and the desired effect signal while providing the control signal, wherein providing continuous adjustment of the control signal minimizes an error between the desired effect signal and the motion characteristic feedback signal.

13. The method of claim 12, wherein providing continuous adjustment of the control signal at the sampling frequency is performed further according to a previous value of at least one of the desired effect signal and the motion characteristic feedback signal.

14. The method of claim 12, wherein providing the control signal to activate the vibration actuator delivers a haptic output to the haptically enabled device via a haptically activated component coupled to the vibration actuator, and measuring the motion characteristic includes measuring acceleration of the haptically activated component by the sensor, the sensor including an accelerometer coupled to the haptically activated component.

15. The method of claim 12, wherein measuring the motion characteristic includes measuring the motion characteristic based on image shake recorded by the sensor, the sensor including a camera mounted to the component.

16. The method of claim 12, wherein the haptically activated component is a sub-component of the vibration actuator.

17. The method of claim 16, wherein the sub-component is a mass of the vibration actuator and measuring the motion characteristic includes measuring displacement of the mass by the sensor, the sensor including an emitting diode and a receiving diode.

18. The method of claim 16, wherein the sub-component is a mass of the vibration actuator and measuring the motion characteristic includes measuring the strain of a spring of the vibration actuator.

19. The method of claim 12, wherein providing continuous adjustment of the control signal is performed according to proportional derivative control.

20. The method of claim 12, wherein providing continuous adjustment of the control signal is performed according to lead compensation control.

21. The method of claim 12, wherein providing continuous adjustment of the control signal occur for a portion of the limited duration haptic effect that is less than the entirety of the duration of the limited duration haptic effect.

22. The method of claim 12, wherein the vibration actuator includes at least one of a linear resonant actuator, a macrofiber composite actuator, and a piezoceramic actuator.

* * * * *